(12) United States Patent
Kurzeja et al.

(10) Patent No.: US 6,557,659 B1
(45) Date of Patent: May 6, 2003

(54) DRIVELINE ASSEMBLY WITH VIBRATION DAMPENER

(75) Inventors: Patrick Kurzeja, White Lake, MI (US); Jim Hawkins, Madison, AL (US); Christos Kyrtsos, Southfield, MI (US); Ronald N. Brissette, Lake Orion, MI (US); Christopher S. Keeney, Troy, MI (US); Jack Darrin Oates, Fletcher, NC (US); Tom Sanko, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/661,838

(22) Filed: Sep. 14, 2000

(51) Int. Cl.$^7$ .............................................. B60K 17/35
(52) U.S. Cl. ........................ 180/245; 180/381; 464/92; 464/113
(58) Field of Search ........................... 464/92, 113, 114; 180/233, 245, 248, 381

(56) References Cited

U.S. PATENT DOCUMENTS

| | | | |
|---|---|---|---|
| 1,356,899 A | * 10/1920 | Baits | |
| 1,708,924 A | 4/1929 | Cole et al. | |
| 1,900,052 A | 3/1933 | Garrett | |
| 1,996,311 A | 4/1935 | Tremolada | |
| 2,010,489 A | 8/1935 | Ice | |
| 2,171,999 A | 9/1939 | Weiland | |
| 2,360,149 A | * 10/1944 | Moser | |
| 2,499,569 A | 3/1950 | Cooley | |
| 2,691,283 A | * 10/1954 | Stover | |
| 2,691,875 A | 10/1954 | Schmitter | |
| 3,857,642 A | 12/1974 | Miller | |
| 3,995,513 A | * 12/1976 | Amdall | ........................ 74/574 |
| 4,129,394 A | 12/1978 | Eichinger et al. | |
| 4,165,793 A | * 8/1979 | Marsch et al. | ............... 180/233 |
| 4,522,608 A | 6/1985 | Joyner | |
| 4,548,591 A | * 10/1985 | Haldric et al. | ................. 464/89 |
| 4,726,254 A | * 2/1988 | Kubo et al. | ............... 74/665 T |
| 4,756,506 A | 7/1988 | Meyers et al. | |
| 4,772,245 A | 9/1988 | Readman et al. | |
| 4,954,005 A | 9/1990 | Knasel et al. | |
| 5,085,289 A | * 2/1992 | Chance | ........................ 180/383 |
| 5,389,040 A | 2/1995 | Kakimi | |
| 5,474,499 A | 12/1995 | Olson | |
| 5,657,671 A | 8/1997 | Morii | |
| 5,863,253 A | 1/1999 | Rohs et al. | |
| 5,916,026 A | 6/1999 | Sadakata | |
| 6,123,620 A | * 9/2000 | Polakowski | ................... 484/73 |
| 6,190,259 B1 | * 2/2001 | Higashino | ..................... 464/93 |

* cited by examiner

*Primary Examiner*—Avraham Lerner
(74) *Attorney, Agent, or Firm*—Carlson, Gaskey & Olds, PC

(57) ABSTRACT

A driveline assembly for interconnecting one driveline component to another driveline component includes a vibration dampening mechanism. The vibration dampening mechanism is installed between a universal joint member and a companion flange. The universal joint member is coupled to a driveshaft and the companion flange is coupled to a drive axle member. A resilient member is secured between the universal joint and the companion flange for absorbing vibrations transmitted between the axle member and the driveshaft. Together the universal joint and companion flange define a central axis. The resilient member is compressible in a linear direction along the central axis to absorb vibrations.

12 Claims, 1 Drawing Sheet

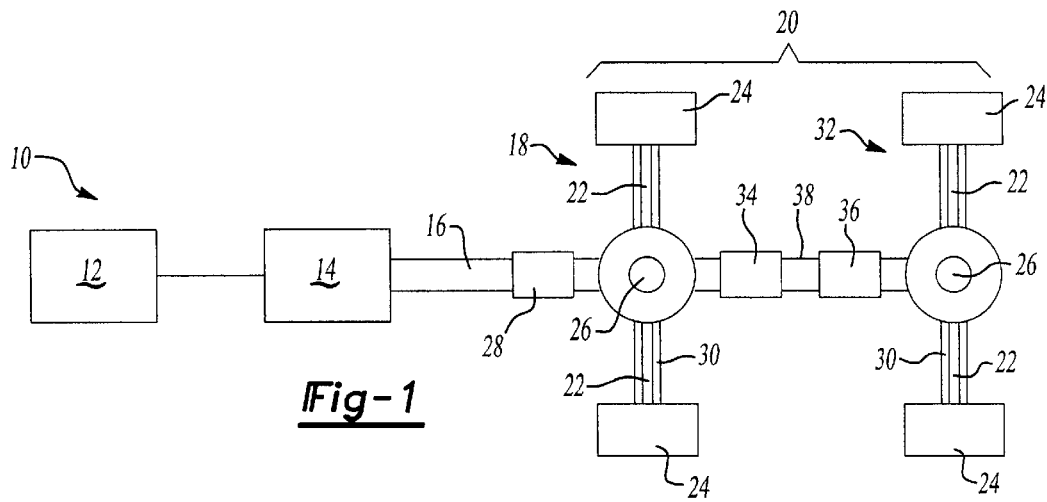
*Fig-1*
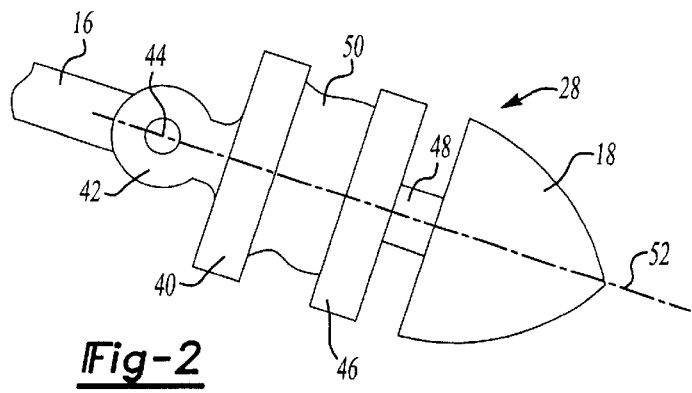
*Fig-2*
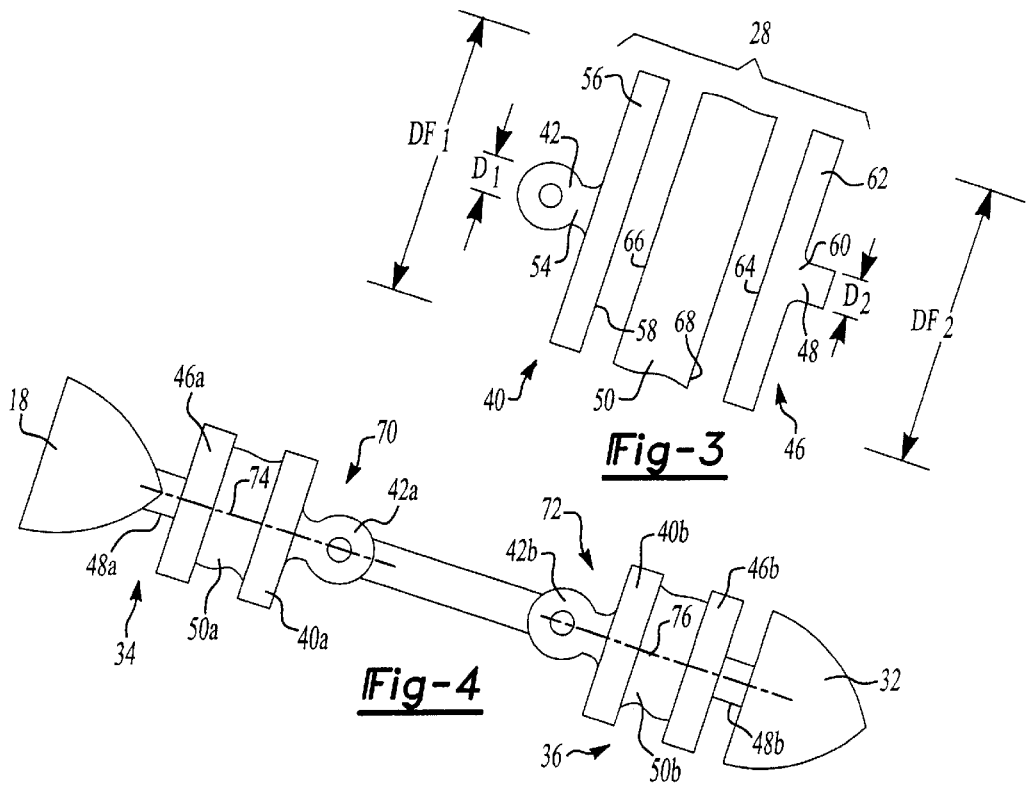
*Fig-3*
*Fig-4*

DRIVELINE ASSEMBLY WITH VIBRATION DAMPENER

BACKGROUND OF THE INVENTION

This invention relates to driveline assembly that includes a resilient member incorporated into the universal joint assembly for dampening torsional vibrations.

Vehicle drivelines/drivetrains include a plurality of components that are interconnected to transfer torque from an engine to the vehicle wheels. A typical configuration includes an engine that transfers torque to a transmission that is coupled to a drive axle via a driveshaft. Universal joint assemblies are mounted at either end of the driveshaft to facilitate the transfer of torque between components that are coplanar but not coinciding. In order to avoid damaging vibrations, the components must be properly aligned with one another. For example, universal joint angles should be within plus or minus one-half of a degree (+/−½°) when located on a common driveshaft.

Most heavy vehicles, such as Class 8 tractors, are equipped with air ride suspensions that can be adjusted between multiple ride height positions either by the original equipment manufacturers (OEMs) or by the vehicle driver. When adjustments are made to the suspension, the preferred universal joint angles are often exceeded resulting in vibrations. These vibrations can be transmitted along the drivetrain causing damage to various components such as axle gearing, driveshafts, and transmission synchronizers, for example.

Thus, it is desirable to provide a driveline having a vibration dampening mechanism that can absorb damaging vibrations before the vibrations are transmitted to other drivetrain components. The vibration dampening mechanism should be inexpensive, easy to install, and easy to maintain.

SUMMARY OF THE INVENTION

A driveline assembly includes a vibration dampening mechanism to reduce vibrations occurring between driveline components as a result of improperly aligned components. The driveline assembly has a universal joint with an attachment portion for connection to a driveshaft and a companion flange with a mount for securing the companion flange to an axle member. A resilient member is positioned between the universal joint and the companion flange to absorb the vibrations transmitted between the axle member and the driveshaft.

One disclosed embodiment of this invention is incorporated into a drive axle assembly. The drive axle assembly includes a first axle shaft, a second axle shaft, and a central differential in driving engagement with the first and second axle shafts. An axle housing encloses the central differential and the first and second axle shafts. An input is coupled to the central differential and includes the universal joint member with the attachment portion for connection to the driveshaft. The companion flange is mounted between the universal joint and the housing. The resilient member is secured between the universal joint and the companion flange to absorb vibrations transmitted between the central differential and the driveshaft. Preferably, the companion flange and universal joint together define a central axis with the resilient member being compressible in a linear direction along the central axis to reduce vibrations.

Another disclosed embodiment of this invention is incorporated into a tandem drive axle. The tandem drive axle includes a forward drive axle with a first input and an output, a rearward drive axle having a second input, and a driveshaft in driving engagement between the output and the second input. A first connector assembly is used to transfer drive torque from the output to the driveshaft. The first connector assembly includes a first companion flange coupled to the output, a first universal joint coupled to the driveshaft, and a first resilient member secured between the first universal joint and the first companion flange to absorb vibrations transmitted from the forward drive axle to the drive shaft. The tandem axle also includes a second connector assembly that transfers torque from the driveshaft to the second input and which includes a second universal joint coupled to the driveshaft, a second companion flange coupled to the second input, and a second resilient member secured between the second universal joint and the second companion flange to absorb vibrations transmitted from the driveshaft to the rearward drive axle.

These and other features of the present invention can be best understood from the following specification and drawings, the following of which is a brief description.

BRIEF DESCRIPTION OF THE DRAWINGS

FIG. 1 is a schematic overhead view of a vehicle driveline.

FIG. 2 is a schematic side view of a single drive axle incorporating the subject invention.

FIG. 3 is a magnified exploded view of the assembly shown in FIG. 2.

FIG. 4 is a schematic side view of a tandem drive axle incorporation the subject invention.

DETAILED DESCRIPTION OF A PREFERRED EMBODIMENT

A drivetrain/driveline assembly is shown generally at 10 in FIG. 1. The driveline 10 includes an engine 12 that transfers driving torque to a transmission 14. A driveshaft 16 connects the transmission to a front drive axle 18 of a tandem axle assembly 20. The drive axle 18 includes a pair of axle shafts 22 for driving vehicle wheels 24. The drive axle 18 uses a differential assembly 26 to provide torque to the axle shafts 22. The differential assembly 26 receives torque from an input 28, which is coupled to the driveshaft 16. The differential assembly 26 and the axle shafts 22 are enclosed within an axle housing 30.

The tandem axle assembly 20 includes a rear drive axle 32 that is similarly configured to the front drive axle 18. The rear drive axle 32 includes a pair of axle shafts 22 for driving a pair of vehicle wheels 24 and a differential assembly 26 that provides torque to the axle shafts 22. The front drive axle 18 has an output 34 that is coupled to a second input 36 for the rear drive axle 32 with an interconnecting driveshaft 38.

As shown in FIG. 2, the input 28 to the front drive axle 18 includes a vibration dampening mechanism and is comprised of a universal joint 40 having an attachment portion 42 for connection to the driveshaft 16. Preferably, a pivot 44 is used to attach the universal joint 40 and the driveshaft 16. A companion flange 46 with a mount 48 is used to secure the companion flange 46 to the drive axle 18. A resilient member 50 is positioned between the universal joint 40 and the companion flange 46 to absorb vibrations transmitted between the axle 18 and the driveshaft 16. The resilient member 50 also prevents transmission of vibrations to other driveline components such as the rear drive axle 32 or transmission 14, for example.

Together, the companion flange 46 and the universal joint 40 define a central axis 52. The resilient member 50 is compressible in a linear direction along the central axis 52 to reduce the vibrations. Preferably, the resilient member 50 is a rubber or rubber-type of material that can be compressed and expanded as the axle 18, companion flange 46, and/or universal joint 40 push or pull against the resilient member 50.

As shown in FIG. 3, the universal joint 40 includes a main body 54 with a first flanged portion 56 presenting a generally flat engagement surface 58 for attachment to the resilient member 50. The companion flange 46 includes a central body 60 having a second flanged portion 62 presenting a generally flat engagement surface 64 for attachment to the resilient member 50. The resilient member 50 has a first side surface 66 and a second side surface 68 facing in an opposite direction from the first side surface 66. The engagement surfaces 58, 64 of the first 56 and second 62 flanged portions grippingly engage the opposing sides 66, 68 of the resilient member 50. The resilient member 50 can be secured to the companion flange 46 and the universal joint 40 with an adhesive or by other joining methods known in the art.

The first flanged portion 56 extends radially outwardly from the main body 54 to define a first flange diameter DF1 that is larger than the diameter D1 of the main body 54. The second flanged portion 62 extends radially outwardly from the central body 60 to define a second flange diameter DF2 that is larger than the diameter D2 of the central body 60. Preferably, the first DF1 and second DF2 flange diameters are equal.

While shown as being installed at the input 28 to the front drive axle 18, it should be understood that the vibration dampening mechanism could be installed at various locations within the drivetrain 10. A single vibration dampening mechanism can be used or multiple vibration dampening mechanisms could be installed at various locations within the drivetrain 10.

In one embodiment, shown in FIG. 4, a pair of vibration dampening mechanisms is installed in a tandem drive axle assembly 20. As discussed above, the tandem drive axle 20 includes a forward drive axle 18 having an input 28 and an output 34 and a rear drive axle 32 having an input 36. An interconnecting driveshaft 38 is in driving engagement between the output 34 and the input 36 to the rear drive axle 32.

The output 34 includes a connector assembly 70 for transferring torque from the output 34 to the driveshaft 38. The vibration dampening mechanism is installed within the connector assembly 70 and includes companion flange 46a coupled to the output 34, a universal joint 40a coupled to the driveshaft 38, and a resilient member 50a secured between the universal joint 40a and the first companion flange 46a for absorbing vibrations transmitted from the forward drive axle 18 to the drive shaft 38. The input 36 to the rear drive axle 32 includes a second connector assembly 72 for transferring torque from the driveshaft 38 to the input 36. A second vibration dampening mechanism is installed within the second connector assembly 72 and includes a universal joint 40b coupled to the driveshaft 38, a companion flange 46b coupled to the input 36, and a resilient member 50b secured between the universal joint 40b and the companion flange 46b for absorbing vibrations transmitted from the driveshaft 38 to the rear drive axle 32.

The universal joints 40a, 40b each include attachment portions 42a, 42b for connection to the interconnecting driveshaft 38. The companion flanges 46a, 46b are mounted between the respective universal joints 40a, 40b and the axle housing 30. The universal joint 40a and the companion flange 46a from the front drive axle. 18 define a first central axis 74 and the universal joint 40b and the companion flange 46b define a second central axis 76. Typically, the first 74 and second 76 central axes are transverse to one another. Preferably, the resilient member 50a is compressible in a linear direction along the first central axis 74 to reduce vibrations and the other resilient member 50b is compressible in a linear direction along the second central axis 76 to reduce vibrations.

The subject vibration dampening mechanism is easily installed and maintained within the vehicle driveline 10. The mechanism reduces vibrations and prevents transmission of vibrations to other driveline components. Thus, driveline components are not subject to damaging vibrations resulting in improved fatigue lives.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A drive axle assembly comprising:
   a first axle shaft;
   a second axle shaft;
   a central differential in driving engagement with said first and second axle shafts;
   an axle housing substantially enclosing said central differential and said first and second axle shafts;
   an input including a driveshaft operably coupled to said central differential and having a universal joint with an attachment portion for connection to said driveshaft, a companion flange mounted between said universal joint and said axle housing, and a resilient member directly secured between said universal joint and said companion flange, said resilient member being resiliently compressible and expandable to absorb vibrations transmitted between said central differential and said driveshaft.

2. An assembly as set forth in claim 1, wherein said companion flange and universal joint define a central axis with said resilient member being compressible in a linear direction along said central axis to reduce vibrations.

3. An assembly as set forth in claim 2, wherein said universal joint has a first radially extending flange defining a first flat engagement surface and said companion flange has a second radially extending flange presenting a second flat engagement surface, said resilient member being sandwiched between said first and second flat engagement surfaces.

4. An assembly as set forth in claim 1, wherein said universal joint and said companion flange are mounted in a non-overlapping relationship to each other.

5. An assembly as set forth in claim 4, wherein said universal joint defines a first end face and said companion flange defines a second end face longitudinally spaced apart from said first end face along a central axis of rotation with said resilient member supported between said first and second end faces to maintain a minimum predetermined distance between said universal joint and said companion flange.

6. An assembly as set forth in claim 5, wherein said resilient member is supported between said universal joint and said companion flange by attachment solely to said first and second end faces.

7. An assembly as set forth in claim 1, wherein said universal joint defines a first end face and said companion flange defines a second end face longitudinally spaced apart from said first end face along a central axis of rotation with said resilient member supported between said universal joint and said companion flange by attachment solely to said first and second end faces preventing overlap between said universal joint and said companion flange.

8. A tandem drive axle assembly comprising:
   a front drive axle having a first input and an output;
   a rear drive axle having a second input;
   a driveshaft in driving engagement between said output and said second input;
   a first connector for transferring torque from said output to said driveshaft and having a first companion flange coupled to said output, a first universal joint coupled to said driveshaft, and a first resilient member secured between said first universal joint and said first companion flange for absorbing vibrations transmitted from said front drive axle to said drive shaft; and
   a second connector for transferring torque from said driveshaft to said second input and having a second universal joint coupled to said driveshaft, a second companion flange coupled to said second input, and a second resilient member secured between said second universal joint and said second companion flange for absorbing vibrations transmitted from said driveshaft to said rear drive axle.

9. An assembly as set forth in claim 8, wherein said first universal joint and said first companion flange define a first central axis and said second universal joint and said second companion flange define a second central axis that is transverse to said first central axis.

10. An assembly as set forth in claim 9, wherein said first resilient member is compressible in a linear direction along said first central axis to reduce vibrations and said second resilient member is compressible in a linear direction along said second central axis to reduce vibrations.

11. An assembly as set forth in claim 10, wherein said first and second u-joints are connected to said driveshaft with a pivot.

12. An assembly as set forth in claim 8, wherein said first universal joint defines a first end face and said first companion flange defines a second end face longitudinally spaced apart from said first end face along a first central axis of rotation with said first resilient member supported between said first universal joint and said first companion flange by attachment solely to said first and second end faces preventing overlap between said first universal joint and said first companion flange and wherein said second universal joint defines a third end face and said second companion flange defines a fourth end face longitudinally spaced apart from said third end face along a second central axis of rotation with said second resilient member supported between said second universal joint and said second companion flange by attachment solely to said third and fourth end faces preventing overlap between said second universal joint and said second companion flange.

\* \* \* \* \*